(12) United States Patent
Nishimura et al.

(10) Patent No.: US 7,322,292 B2
(45) Date of Patent: Jan. 29, 2008

(54) SQUIB

(75) Inventors: Junichi Nishimura, Shimotsuga-gun (JP); Hiromi Aida, Kanuma (JP); Kazuo Matsuda, Shioya-gun (JP); Kazutaka Saito, Kawachi-gun (JP); Takeshi Kai, Utsunomiya (JP); Etsuya Miyake, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 10/982,415

(22) Filed: Nov. 5, 2004

(65) Prior Publication Data

US 2005/0115438 A1 Jun. 2, 2005

(30) Foreign Application Priority Data

Nov. 10, 2003 (JP) ............................. 2003-379872

(51) Int. Cl.
*F42B 3/12* (2006.01)
(52) U.S. Cl. .............................. 102/202.9; 102/202.14; 280/741; 361/251
(58) Field of Classification Search ............. 102/202.9, 102/202.12, 202.14; 280/741; 361/251
See application file for complete search history.

(56) References Cited

U.S. PATENT DOCUMENTS

| | | | |
|---|---|---|---|
| 4,306,499 A | | 12/1981 | Holmes |
| 5,847,309 A | | 12/1998 | Baginski |
| 5,905,226 A | | 5/1999 | Baginski |
| 5,932,832 A | * | 8/1999 | Hansen et al. ............ 102/202.4 |
| 5,988,069 A | * | 11/1999 | Bailey ...................... 102/202.9 |
| 6,085,659 A | * | 7/2000 | Beukes et al. .............. 102/206 |
| 6,192,802 B1 | | 2/2001 | Baginski |
| 6,199,484 B1 | * | 3/2001 | Martinez-Tovar et al. ........................ 102/202.4 |
| 6,295,935 B1 | | 10/2001 | Swann et al. |
| 6,343,000 B1 | * | 1/2002 | Yokoyama et al. ......... 361/247 |
| 2004/0103811 A1 | * | 6/2004 | Okamoto et al. ........ 102/202.5 |

FOREIGN PATENT DOCUMENTS

| | | |
|---|---|---|
| EP | 0613806 A | 9/1994 |
| EP | 0805074 A | 11/1997 |
| EP | 0888227 B | 1/1999 |
| JP | 54-151109 | 11/1979 |
| JP | S57-142498 | 9/1982 |
| JP | 10154992 | 6/1998 |
| JP | 2000124932 | 4/2000 |
| JP | 2000241098 | 9/2000 |
| JP | 2004-203294 | 7/2004 |
| WO | WO 03/064220 A | 8/2003 |
| WO | WO 03/091077 A | 11/2003 |

* cited by examiner

*Primary Examiner*—Stephen M Johnson
(74) *Attorney, Agent, or Firm*—Carrier, Blackman & Associates, P.C.; Joseph P. Carrier; William D. Blackman

(57) ABSTRACT

A squib that is used by being connected to a bus is formed by assembling an explosive unit and a communication/ignition unit that have been constructed as separate components. The communication/ignition unit is provided with an IC substrate for ignition and communication that is electrically connected to a bus wire. The explosive unit is provided with explosive, an ignition element, and a header that is interposed between the ignition element and the IC substrate, and that electrically connects the two. In this IC integrated type of squib that is used for communication and ignition, it is possible to prevent the explosive and the IC from mutually interfering with the performances of each other.

16 Claims, 3 Drawing Sheets

SQUIB

BACKGROUND OF THE INVENTION

1. Field of the Invention

Priority is claimed on Japanese Patent Application No. 2003-379872, filed Nov. 10, 2003, the contents of which are incorporated herein by reference.

The present invention relates to a squib (i.e., an ignition apparatus) that is used in a system that uses an explosive such as, for example, a pretensioner apparatus or an airbag apparatus for an automobile.

1. Description of Related Art

Occupant protection apparatuses such as pretensioner apparatuses and airbag apparatuses that are mounted in automobiles operate by being ignited by a squib (i.e., an ignition apparatus) in which a gas generating agent is contained in an inflator, and high pressure gas that is generated by the combustion thereof is introduced into an airbag or the like.

A squib is constructed such that an igniting element is mounted on a header to which is fixed a connecting terminal in the form of a pin. In addition, an igniting agent in the form of an explosive is inserted under pressure into a cap so as to be in contact with the igniting element. The pin that is fixed to the header is electrically connected with a master control unit.

In recent years, a large number of occupant protection apparatuses such as airbag apparatuses and the like that deploy from a steering wheel, a side portion of a seat, and a side portion of the roof have come to be mounted in vehicles, and, to correspond to this, inventions relating to the use of buses between occupant protection apparatuses have been proposed (for example, Japanese Patent Application Laid-Open (JP-A) Nos. 10-154992 and 2000-124932).

In addition, to match this use of buses, inventions relating to squibs inside which are mounted integrated circuits (IC) for communication and ignition have been proposed (for example, Japanese Patent No. 3294582).

However, in the squib structure disclosed in Japanese Patent No. 3294582, because both the explosive and the IC are present together inside a casing cap, there is a possibility that each one will interfere with the performance of the other.

For example, as far as the explosive is concerned, the promotion of a chemical reaction of the explosive may be hindered by moisture contained in the IC. Moreover, as a result of the IC occupying a portion of the interior of a casing cap, the volume of the explosive that can be pressure inserted therein is reduced, thereby affecting the explosive by limiting the heat and pressure that can be created.

On the other hand, as far as the IC is concerned, the IC is affected by gas discharged from the explosive. Moreover, the IC is also affected, for example, by the fact that the shape of the packaging of the IC has to match the shape of the cap so that the density of the explosive is uniform when the explosive is pressure inserted in the casing cap.

The present invention was conceived in view of the above circumstances, and it is an object thereof to prevent an explosive and an IC from mutually interfering with the performances of each other in a squib that is integrated with an IC for communication and ignition.

SUMMARY OF THE INVENTION

In order to achieve the above described object, the present invention provides a squib (for example, the squibs 2a, 2b, 2c, . . . in the embodiment described below) for connecting to a bus (for example, the bus wire 3 in the embodiment described below), the squib being able to be selectively operated by electrical energy (for example, power in the embodiment described below) and electrical signals (for example, control signals and ignition execution signals in the embodiment described below) supplied from a control apparatus (for example, the control unit 1 in the embodiment described below), and a plurality of the squibs being connected via a common bus wire to the control apparatus, wherein a communication/ignition unit (for example, the communication/ignition unit 50 in the embodiment described below) that is provided with a communication/ignition circuit (for example, the control circuit 21 and the like that is mounted on the IC substrate 51 in the embodiment described below) that is electrically connected to the bus wire is assembled in an explosive unit (for example, the explosive unit 40 in the embodiment described below) that is provided with an explosive (for example, the explosive 42 in the embodiment described below), an ignition element (for example, the ignition element 30 in the embodiment described below), and a header (for example, the header 43 in the embodiment described below) that is interposed between the ignition element and the communication/ignition circuit and that electrically connects the two.

According to this structure, because the explosive, the ignition element, and the header are completed as a single component, the volume and density of the explosive can be made constant irrespective of the size and configuration and the like of the assembled communication/ignition circuit.

In addition, because the explosive and the communication/ignition circuit are completely separated by the header, moisture contained in the communication/ignition circuit is not able to move to the explosive side, and gas that is discharged from the explosive is not able to move to the communication/ignition circuit side.

According to the present invention, because the explosive, the ignition element, and the header are completed as a single component, and because the explosive and the communication/ignition circuit are completely separated by the header, it is possible to prevent the explosive and the communication/ignition circuit from mutually interfering with the performances of each other.

Moreover, because the respective units are produced separately and are then subsequently assembled, it is possible to achieve an improvement in the production technique. In addition, the communication/ignition circuit (i.e., the communication/ignition unit side) and the squib (i.e., the explosive unit side) can be manufactured by specialist manufacturers, so that the performance and reliability of each are improved.

BRIEF DESCRIPTION THE DRAWINGS

DETAILED DESCRIPTION OF THE INVENTION

While preferred embodiments of the invention are described and illustrated herein, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is commensurate with the scope of the appended claims.

A preferred embodiment of the present invention will now be described with reference made to FIGS. 1 to 4.

Note that the squib of the present embodiment is preferably used in an occupant protection apparatus such as an airbag apparatus and a pretensioner apparatus that is mounted in a vehicle such as, for example, an automobile. As an example thereof, a description is given below of when an occupant protection apparatus that is provided with a squib is mounted in an automobile.

Figure 1:
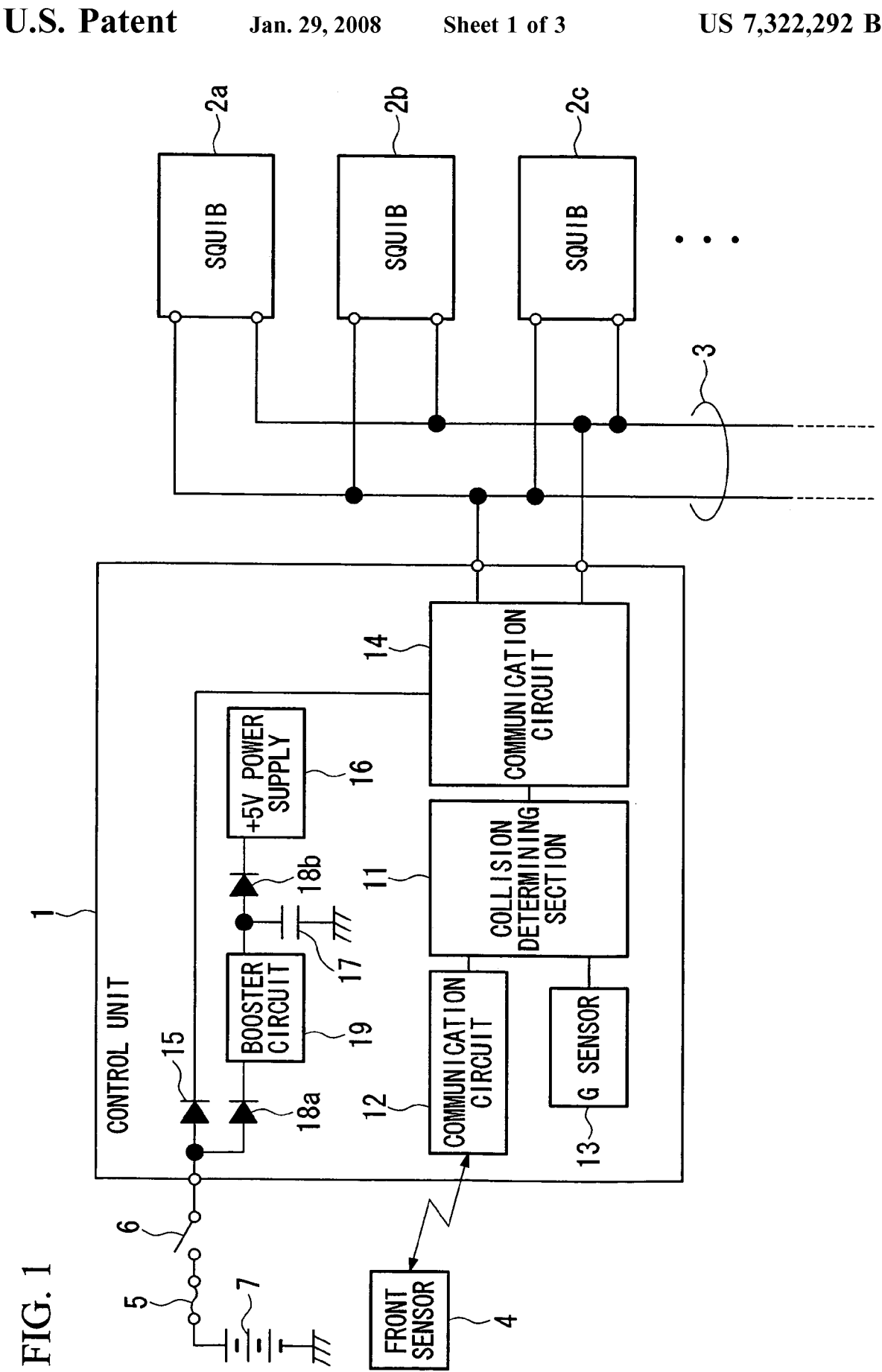
FIG. 1 is a block diagram of an ignition system provided with the squib according to an embodiment of the present invention.

In FIG. 1, a control unit 1 is a control section that forms the center of an occupant protection apparatus that protects an occupant of a vehicle from an impact acting on the vehicle. Squibs (ignition apparatuses) 2a, 2b, 2c, . . . of a plurality of auxiliary restraining apparatuses (not shown) that are provided in suitable locations in the vehicle in order to protect an occupant are provided 1 to 1 for the auxiliary restraining apparatuses and are connected to the control unit 1 using, for example, one of two pairs of wires provided in an unbalanced type of bus line 3. Note that the squibs 2a, 2b, 2c, . . . are apparatuses that operate the auxiliary restraining apparatuses using an igniting agent (i.e., an explosive that lights a gas generating agent of the auxiliary restraining apparatus), and an igniting agent (corresponding to explosive 42) is incorporated inside each. The squibs 2a, 2b, 2c, . . . operate the auxiliary restraining apparatuses by igniting the igniting agent 54 based on ignition executing signals (i.e., ignition execute commands) that are sent to the designated communication addresses of the squibs 2a,2b, 2c, . . . from the control unit 1.

A collision determining section 11 in the form of a central processing unit (CPU) is provided in the control unit 1. The collision determining section 11 determines whether or not an impact that requires the occupant restraining apparatuses of the vehicle to be operated has acted on the vehicle due to the vehicle colliding with another object based on output signals from a front sensor 4 that is provided in a front portion of the vehicle and is connected via a communication circuit 12 to the collision determining section 11 and that detects a rate of acceleration due to a deformation of the front portion of the vehicle, and based on output signals from a G sensor 13 that is provided in the control unit 1 and detects the rate of acceleration of the vehicle.

On the other hand, a communication circuit 14 that supplies power (i.e., electrical energy) to the squibs 2a, 2b, 2c, . . . via the bus wire 3 and that performs control signal (i.e., electrical signal) communication with the squibs 2a, 2b, 2c, . . . by designating the communication addresses thereof is provided in the control unit 1. When the collision determining section 11 determines that an unnecessary impact has acted on the vehicle due to the vehicle colliding with another object, an ignition execution signal (i.e., an ignition execution command) is sent by the communication circuit 14 via the bus line 3 to the squibs 2a, 2b, 2c, . . . in order to operate an auxiliary restraining apparatus (not shown).

A vehicle mounted battery 7 that stores power used by the vehicle is also connected to the control unit 1 via an ignition switch (IG•SW) 6 and a fuse 5 that is used to prevent current surges. Power from the vehicle mounted battery 7 that is input via a protective diode 15 that prevents current counter flow is supplied to a +5v power supply 16 that creates a power supply for the CPU and the like that constitute the collision determining section 11. In addition, this power is supplied to the communication circuit 14 that supplies power to the squibs 2a, 2b, 2c . . . . Furthermore, the control unit 1 is also provided with a backup condenser 17 that backs up the power supply by storing power, protective diodes 18a and 18b that charge the backup condenser 17, and booster circuit 19 such that the control unit 1 operates for a fixed time even if the supply of power from the vehicle mounted battery 7 is stopped.

Note that because the squibs 2a, 2b, 2c, . . . that are connected to the common bus wire 3 all have an identical structure, only the squib 2a is described below as an example.

Figure 2:
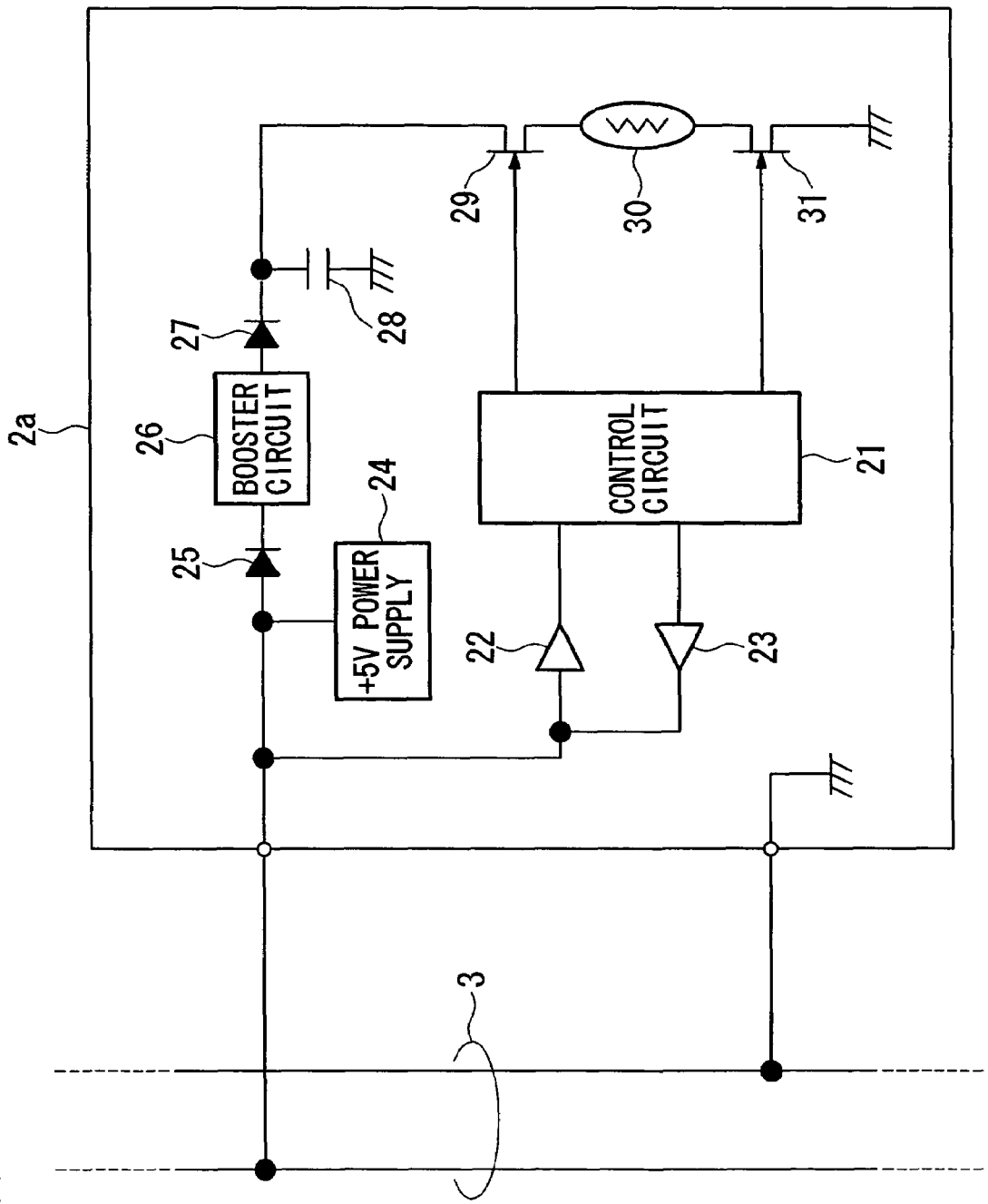
FIG. 2 is a block diagram of a squib according to the same embodiment.

As is shown in FIG. 2, a control circuit 21 that executes ignition control based on a diagnosis of communications by the bus wire 3 and on instructions from the control unit 1 is provided in the squib 2a. Control signals (i.e., commands) are input into the control circuit 21 from the bus wire 3 via a reception buffer 22, and response signals (i.e., responses) responding to the control signals are output from the control circuit 21 to the bus wire 3 via a transmission buffer 23.

Power supplied from the bus wire 3 is supplied to a +5V power supply 24 that creates a power supply for the control circuit 21 and the like. Power from the bus wire 3 is also supplied via a protective diode 25 to a booster circuit 26 that generates the power required for the squib 2a to ignite the igniting agent and operate the auxiliary restraining apparatus.

A condenser 28 is connected via a protective diode 27 to an output of the booster circuit 26. The power that is boosted by the booster circuit 26 and is required for the squib 2a to ignite the igniting agent and operate the auxiliary restraining apparatus can be stored in the condenser 28.

In parallel with the condenser 28, a series circuit made up of a switching element 29, an ignition element 30 that ignites the igniting agent incorporated in the squib 2a, and a switching element 31 is connected to an output (i.e., a cathode terminal) of the protective diode 27. Specifically, one terminal of the ignition element 30 is connected via the switching element 29 to the output of the protective diode 27, while the other terminal of the ignition element 30 is grounded via the switching element 31. Control terminals that control the conduction and cutoff of the switching element 29 and the switching element 31 are both connected to the control circuit 21.

Figure 3:
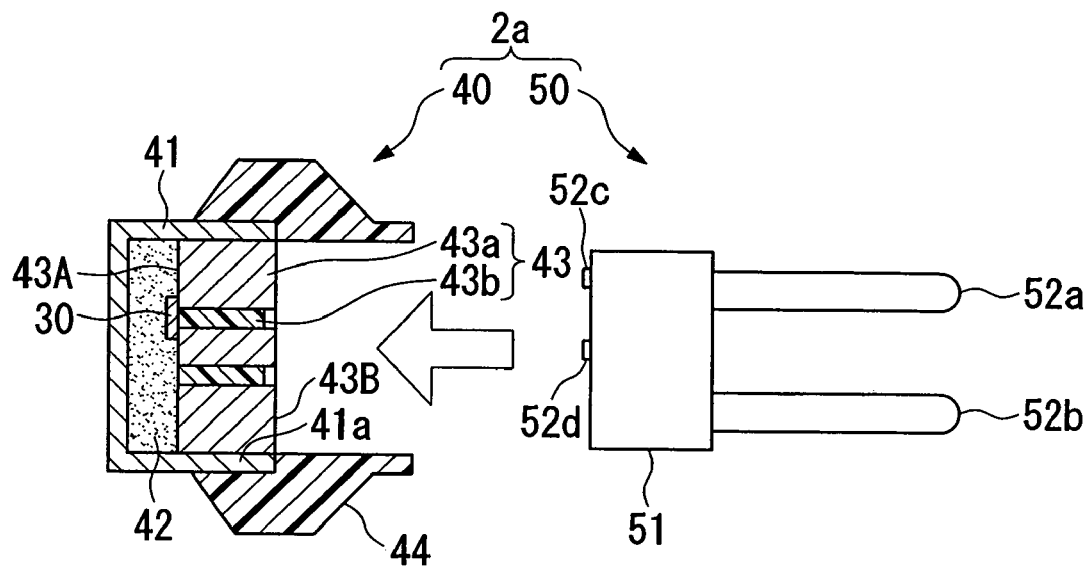
FIG. 3 is an exploded cross-sectional view of a squib according to the same embodiment.
Figure 4:
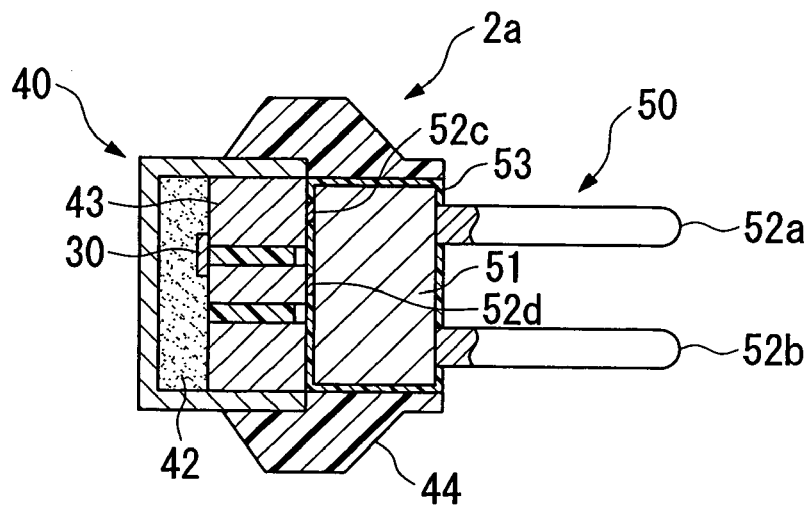
FIG. 4 is a vertical cross-sectional view of a squib according to the same embodiment.

As is shown in FIG. 3 and FIG. 4, the squib 2a is formed by mutually combining an explosive unit 40 and a communication/ignition unit 50 that are in the form of separate components.

The explosive unit 40 is provided with a cylindrical cap 41, one end of which is closed off, explosive 42 with which the cap 41 is filled, a header 43 that is inserted into an aperture side end portion 41a of the cap 41 and is fixed to the cap 41 by, for example, welding or the like, the ignition element 30 that is provided at a distal end surface 43A of the header 43, and a hollow unit connecting portion 44 that is provided at an outer circumference of the cap aperture side end portion 41 a so as to extend further outwards from there in the axial direction.

The explosive 42 is an igniting agent that is used to ignite the gas generating agent of the auxiliary restraining apparatus.

The explosive 42 is completely separated via the header 43 so as to not be in contact with an IC substrate 51, and is kept in a state whereby gas that is discharged by the explosive 42 is not able to move to the IC substrate 51 side, and moisture contained in the IC substrate 51 is not able to move to the explosive 42 side.

As a result, it is possible to use for the explosive 42 an existing squib explosive that is suitable for the ignition of a gas generating agent such as, for example, ZPP.

The header 43 is formed by a header main body 43a that has conductivity, and a tubular non-conductive member 43b that is provided inside the header main body 43a.

By employing a structure such as this, the header 43 makes it possible for the ignition element 30 that is provided at the distal end surface 43A of the header 43 to be electrically connected with the IC substrate 51 of the communication/ignition unit 50. Moreover, as described above, the header 43 also has the role of serving as a partition that totally isolates the explosive 42 in a non-contact state from the IC substrate 51.

The communication/ignition unit 50 is provided with the IC substrate 51 that is used for communication and ignition. Pins 52a and 52b, which are connecting terminals that are connected to the two-wire type bus wire 3, which is an external signal wire, are connected to the IC substrate 51 so as to extend from the rear end side thereof. In addition, pins 52c and 52d, which are connecting terminals that are connected to the header 43 constituting the explosive unit 40, are also connected to the IC substrate 51 so as to extend from the front end side thereof. As shown, pins 52c and 52d, are connected to the header 43 without extending through the header 43. As such, the header 43 is the exclusive electrical connection between the communication/ignition unit 50 and the ignition element 30.

On the IC substrate 51 are mounted the aforementioned control circuit 21, reception buffer 22, transmission buffer 23, +5V power supply 24, protective diode 25, booster circuit 26, protective diode 27, condenser 28, switching element 29, and switching element 31.

The squib 2a may be assembled using, for example, the following process.

Firstly, the explosive 42 and header 43 are inserted in this order in the cap 41, and the cap 41 and header 43 are integrated by welding or the like. Next, the unit connecting portion 44 that has been molded in advance from, for example, resin or the like is fixed to the outer circumference of the cap aperture side end portion 41a. As a result, the explosive unit 40 is constructed. The unit connecting portion 44 may also be molded integrally using resin insert molding or the like with the outer circumference of the cap aperture side end portion 41a.

Separately from the ignition unit 40, the pins 52a, 52b, 52c, and 52d are connected to the IC substrate 51 on which the control circuit 21 is mounted, so as to construct the communication/ignition unit 50.

Next, the communication/ignition unit 50 is inserted into the hollow portion of the unit connecting portion 44 that is provided in the explosive unit 40 until the pins 52c and 52d, which extend on the distal end side of the IC substrate 51 contact the header 43. After this, by sealing the gap between the unit connecting portion 44 and the IC substrate 51 using resin molding 53, the explosive unit 40 and the communication/ignition unit 50 are integrated.

In this manner, because the gap between the unit connecting portion 44 and the IC substrate 51 is filled with resin, it is not necessary to make the inner configuration of the unit connecting portion 44 correspond to the outer configuration of the IC substrate 51.

In a squib 2a that is formed by assembling a communication/ignition unit 50 in an explosive unit 40 in this manner, control signals are supplied to the control circuit 21 via the pins 52a and 52b, and power for ignition is supplied to the ignition element 30 via the pins 52a and 52b, the IC substrate 51, the pins 52c and 52d, and the header 43.

Accordingly, when the control unit 1 supplies power to the bus wire 3, because the power that the ignition element 30 of the squib 2a requires to ignite the explosive 42 and operate the auxiliary restraining apparatus is stored in the condenser 28, if the control unit 1 sends an ignition execution signal (i.e., an ignition execution command) to the squib 2a in this state, the control circuit 21 of the squib 2a conducts the switching element 29 and the switching element 31, and supplies power stored in the condenser 28 to the ignition element 30. Accordingly, the explosive 42 contained in the squib 2a is exploded and the auxiliary restraining apparatus can be operated.

As has been described above, according to the squibs 2a, 2b, 2c, . . . of the present embodiment, because the explosive 42, the ignition element 30, and the header 43 that constitute the explosive unit 40 are completed as a single component, the volume and density of the explosive 42 can be made constant irrespective of the size and configuration and the like of the IC substrate 51. In addition, because the explosive 42 and the IC substrate 51 are completely isolated by the header 43, moisture contained in the IC substrate 51 is not able to move to the explosive 42 side, and even if corrosive gas (for example, chlorine) is discharged from the explosive 42, it is not able to move to the IC substrate 51 side. Accordingly, it is possible to prevent the explosive 42 and the IC substrate 51 from mutually interfering with the performances of each other.

Moreover, because the respective units 40 and 50 are produced separately and are then subsequently assembled, it is possible to achieve an improvement in the production technique. In addition, because it is possible to employ specialist manufacturers by having the explosive unit 40 manufactured by a squib manufacturer and having the ignition unit 50 manufactured by an IC substrate manufacturer, the performance and reliability of each are improved.

It is to be understood that the present invention is not restricted by the above described embodiment, and various design modifications may be made insofar as they do not depart from the scope of the present invention as indicated by the appended claims. For example, provided that the squib is used in a system that uses an explosive, then the squib is not limited to an occupant protection apparatus such as an airbag apparatus or pretensionar apparatus that is mounted in an automobile, but can be used in a variety of applications.

For example, provided that the squib is used in a system that uses an explosive, then the squib is not limited to an occupant protection apparatus such as an airbag apparatus or pretensioner apparatus that is mounted in an automobile, but can be used in a variety of applications.

What is claimed is:

1. A squib for connecting to a bus, the squib being able to be selectively operated by electrical energy and electrical signals supplied from a control apparatus, and a plurality of the squibs being connected via a common bus wire to the control apparatus, the squib comprising:

a communication/ignition unit that is provided with a communication/ignition circuit that is electrically connected to the bus wire; and an explosive unit having a connecting unit in which the communication/ignition unit is disposed, wherein:

the explosive unit is provided with an explosive, an ignition element, and a header that is interposed between the ignition element and the communication/ignition circuit;

said header is provided with a main body formed of an electrically conductive material; and the main body exclusively electrically connects the ignition element and the communication/ignition circuit, the squib further comprising:

an integrated circuit substrate on which the communication/ignition circuit is provided; and electrical contacts projecting from an end of the integrated circuit substrate and which engage the header without extending though the header.

2. The squib according to claim 1, wherein said explosive unit further comprises a cylindrical cap with a closed end, said explosive, said ignition element and said header being disposed within said cap, with said explosive disposed adjacent said closed end, and said ignition element sandwiched between said explosive and said header.

3. The squib according to claim 1, wherein said header separates said explosive and said communication/ignition unit such that any gas emitted by the explosive is prevented from contacting the communication/ignition unit, and any moisture from the communication/ignition unit does not contact the explosive.

4. The squib according to claim 1, wherein said explosive unit further comprises a cylindrical cap with a closed end, said explosive being disposed within said cap, sandwiched between said closed end and said header.

5. The squib according to claim 4, wherein said header prevents any gas emitted by said explosive over time from contacting said communication/ignition circuit.

6. The squib according to claim 1, wherein said communication/ignition unit and said explosive unit are formed separately and connected together with the connecting unit.

7. The squib according to claim 1, wherein said connecting unit is formed of resin.

8. A squib for connecting to a common bus wire and for being selectively operated by electrical energy and electrical signals supplied from a control apparatus, the squib comprising:

a communication/ignition unit including a communication/ignition circuit provided on an integrated circuit substrate, and which is adapted to be electrically connected to the bus wire;

an explosive unit including an explosive, an ignition element, and a header that is interposed between the ignition element and the communication/ignition circuit; and a connecting unit connecting said communication/ignition unit to said explosive unit; wherein:

the header is provided with a main body formed of an electrically conductive material; and the main body exclusively electrically connects the ignition element and the communication/ignition circuit, wherein the communication/ignition unit comprises electrical contacts projecting from an end of the integrated circuit substrate and which engage the header without extending though the header.

9. The squib according to claim 8, wherein said explosive unit further comprises a cylindrical cap with a closed end, said explosive, said ignition element and said header being disposed within said cap, with said explosive disposed adjacent said closed end, and said ignition element sandwiched between said explosive and said header.

10. The squib according to claim 8, wherein said header separates said explosive and said communication/ignition unit such that any gas emitted by the explosive is prevented from contacting the communication/ignition unit, and any moisture from the communication/ignition unit does not contact the explosive.

11. The squib according to claim 8, wherein said explosive unit further comprises a cylindrical cap with a closed end, said explosive being disposed within said cap, sandwiched between said closed end and said header.

12. The squib according to claim 11, wherein said header prevents any gas emitted by said explosive over time from contacting said communication/ignition circuit.

13. The squib according to claim 8, wherein said connecting unit is formed of resin.

14. An airbag triggering system comprising:

a common bus wire;

a control apparatus;

a plurality of squibs being connected via the common bus wire to the control apparatus and being able to be selectively operated by electrical energy and electrical signals supplied from the control apparatus, each squib comprising:

a communication/ignition unit that is provided with a communication/ignition circuit that is electrically connected to the bus wire; and an explosive unit having a connecting unit in which the communication/ignition unit is disposed, wherein:

the explosive unit is provided with an explosive, an ignition element, and a header that is interposed between the ignition element and the communication/ignition circuit;

said header is provided with a main body formed of an electrically conductive material; and the main body exclusively electrically connects the ignition element and the communication/ignition circuit, wherein the explosive unit, the ignition element, and the header are completed as a single element, and wherein the header completely separates the explosive and the communication/ignition unit such that any gas emitted by the explosive is prevented from contacting the communication/ignition unit, and any moisture from the communication/ignition unit does not contact the explosive, the airbag triggering system further comprising: an integrated circuit substrate on which said communication/ignition circuit is provided; and electrical contacts projecting from an end of the integrated circuit substrate and which engage the header without extending though the header.

15. The airbag triggering system according to claim 14, wherein said explosive unit further comprises a cylindrical cap with a closed end, said explosive, said ignition element and said header being disposed within said cap, with said explosive disposed adjacent said closed end, and said ignition element sandwiched between said explosive and said header.

16. The airbag triggering system according to claim 14, wherein said explosive unit further comprises a cylindrical cap with a closed end, said explosive being disposed within said cap, sandwiched between said closed end and said header, and wherein said header prevents any gas emitted by said explosive over time from contacting said communication/ignition circuit.

* * * * *